May 31, 1955  C. D. TRIPP ET AL  2,709,469
WELDABLE LOCK NUT
Filed June 3, 1949  2 Sheets-Sheet 1
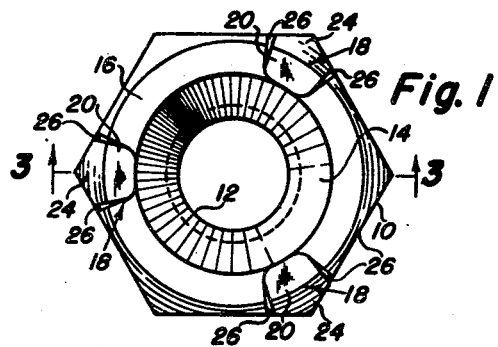
Fig. 1
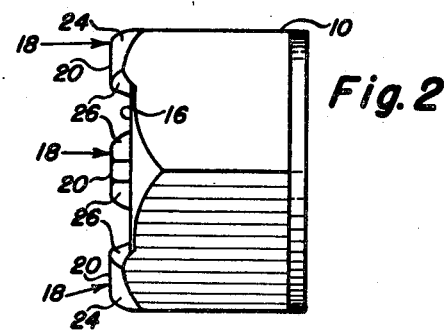
Fig. 2
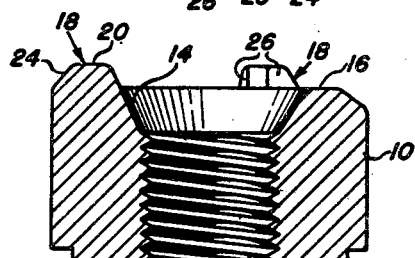
Fig. 3
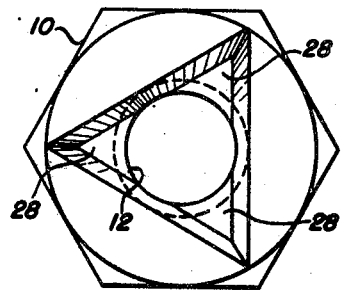
Fig. 4
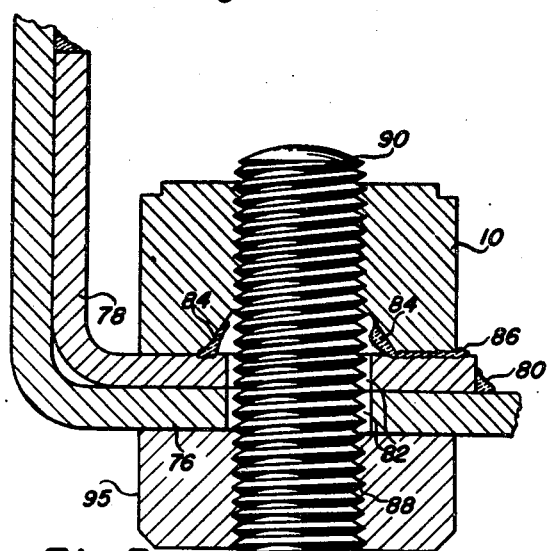
Fig. 5.
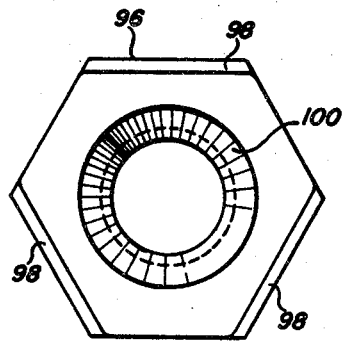
Fig. 6.
Inventors
Chester D. Tripp
Lawrence W. Kass
By 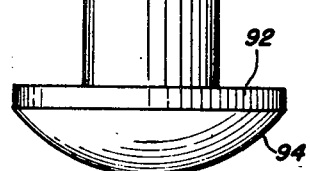
Attorneys May 31, 1955  C. D. TRIPP ET AL  2,709,469
WELDABLE LOCK NUT Filed June 3, 1949  2 Sheets-Sheet 2

Inventors
Chester D. Tripp
Lawrence W. Kass
By Strauch & Hoffman
Attorneys

United States Patent Office 2,709,469
Patented May 31, 1955

2,709,469

WELDABLE LOCK NUT

Chester D. Tripp and Lawrence W. Kass, Chicago, Ill., assignors to Grip Nut Company, South Whitley, Ind., a corporation of Illinois Application June 3, 1949, Serial No. 97,028

2 Claims. (Cl. 151—21)

The present invention relates to weldable lock nuts. Such nuts are welded in place on metal plates and surfaces to receive and locate the threaded ends of securing bolts and the like in places where the application of the usual types of nuts is difficult because of lack of space. They are effectively used among other things to immovably hold machines or other objects in shipping crates, to adjustably secure and locate supporting feet of machines in place, and for other purposes.

Many suggestions for a nut of this type have been made embodying various arrangements of welding projections, with or without a piloting flange on the end face of the nut. Certain of these suggestions to reach the stage of commercial development are disclosed in United States Patents Nos. 2,054,187, September 15, 1936; 2,167,285, July 25, 1939; 2,105,139, January 11, 1938; and 2,069,008, January 26, 1937. Our present improvements, which have important practical advantages over these patented weldable nuts, are primarily characterized by the novel structural forms of the welding projections and their number and arrangement on the end face of the nut. Our invention also provides a novel application of the welding projections to a piloted type of nut by which the piloting flange as well as the body of the nut will be securely welded to the base plate.

A principal object of the invention is to provide welding lugs or projections which are so formed and arranged on the end face of the nut that a weld of maximum security is obtained with a minimum extrusion of welding flash beyond the side faces of the nut.

A further object of the invention in one of its preferred embodiments, resides in the provision of three semi-spherical welding projections equidistantly spaced on the end face of the nut around the axis thereof for three point, self aligning contact with the surface of the base plate to which the nut is to be welded.

An additional object is to provide a nut having an axially projecting piloting flange with welding projections spaced inwardly from the corners of the nut and integrally joined with said flange at its base so that the greater part of the welding flash will flow inwardly between the flange and the opening in the base plate to securely weld the flange to said plate. Preferably the end face of the flange is provided with a comparatively narrow and shallow chamfer or countersink to receive a minor portion of the flash.

Another object of the invention is to provide a nut having a polygonal form with welding lugs projecting axially from an end face thereof, said lugs being preferably located inwardly of the juncture of adjacent side faces of the nut and of such form and dimensions that, under the application of welding heat and pressure to the nut, the major part of the metal of said lugs will flow circumferentially and inwardly toward the nut bore, so that an extensive surface area of the nut face and an opposed face of a supporting member will be securely welded together without fouling the thread in the nut.

A further object resides in the provision of a countersink or chamfer in the end face of the nut to receive the welding flash from said lugs, so that, after welding, a bolt may be readily centered by the chamfer and threaded into the nut bore, without requiring retapping of the nut.

An additional object of the invention resides in the provision of a nut having welding lugs at one end, and distorted thread sections remote from said lugs so as not to be deformed or otherwise affected by the welding heat and adapted to frictionally lock a complementary threaded bolt in adjusted position relative to the nut thereby providing lock nuts for use in places difficult of access.

It is also one of the objects of this invention to provide a weldable lock nut which may be rapidly and inexpensively manufactured by a series of die pressing or stamping operations.

The subject matter of the present application is a continuation-in-part of our pending application Serial No. 27,895, filed May 19, 1948, now abandoned.

With the above and other objects in view, the invention resides in the improved weldable nut as will be hereinafter more fully described, illustrated in the accompanying drawings and subsequently defined in the subjoined claims.

In the drawings wherein we have illustrated preferred practical embodiments of our present improvements in which similar reference characters designate corresponding parts throughout the several views:

Figure 1 is a bottom view showing one commercial form of our improved weldable nut;

Figure 2 is a side elevation thereof;

Figure 3 is a vertical section taken on the line 3—3 of Figure 1;

Figure 4 is a top plan view of the nut;

Figure 5 is a vertical section showing one practical application of our improved welded nut;

Figure 6 is a plan view showing another form of weldable nut;

Figure 7:
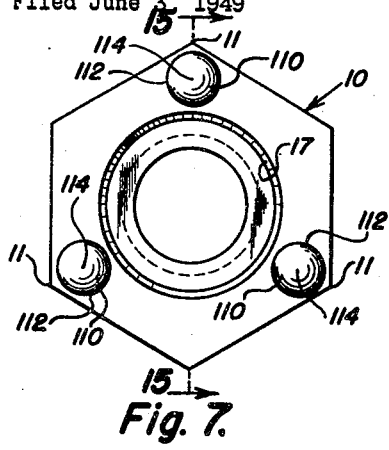
Figure 7 is an end elevation of a nut having semi-spherical welding lugs or projections for self aligning three point contact with a base plate.

Referring first to Figures 1 to 4 of the drawings, for purposes of this explanation we have shown a hexagonal nut body 10, although it will be understood, that the nut may also be of various other shapes and sizes. The nut body 10 is provided with the usual threaded bore 12 and at one end thereof with an outwardly flaring countersink or annular chamfer 14 extending from the flat bottom face 16 of the nut to the end thread of the bore. The distance between the major and minor diameters of the chamfer 14 is approximately twice the depth of the nut thread for a purpose which will be later explained.

Lugs 18 are integrally formed with nut body 10 and project axially from the end face 16 thereof. Preferably, we employ three such welding lugs located at alternate corners of the nut body and in symmetrical relation to radial planes intersecting the lines of juncture between adjacent flat side faces of the nut to provide three circumferentially spaced contact surfaces assuring initial contact between all lugs and the surface of the base plate to which the nut is to be welded.

To obtain proper contact of lugs 18 with the surface of the member to which the nut is to be welded as well as adequate volume of welding metal in each lug and a properly directed flow thereof between the opposed surfaces under heat and pressure in this embodiment, we provide such welding lugs of the form and proportions illustrated in Figures 1, 2 and 3 of the drawings. Thus each lug 18 has an axial depth beyond the end face 16 of the nut which is approximately one-half the lengthwise dimension of the end face 20 of the lug extending circumferentially of the nut and which has contact with the opposed face of the member to which the nut is to be welded. The inner side face 22 of the lug is sloped or inclined inwardly and preferably merges with the inclined wall of the chamfer 14. From the outer edge of contact face 20 of the lug, the outer end face thereof is inclined outwardly on a slight arc which intersects adjacent side faces of the nut body at the corner of the nut body, as shown at 24. The circumferentially spaced or lateral side faces of each lug are inclined or sloped outwardly from the opposite ends of the contact surface 20 to the end face 16 of the nut body as seen at 26. It will thus be understood that the lugs 18 are of greatest radial and circumferential dimensions at their base at the plane of the nut face 16 and gradually decrease therefrom in cross-sectional area both radially and circumferentially of the nut to the contact faces 20 of the lugs. By forming these lugs on the end face of the nut at the points of greatest radial thickness of the nut wall, in the manner above described, the outer edges of contact surfaces 20 may be located approximately on the projected major diameter of the annular flat end face 16 of the nut. Thus when subjected to the proper heat and pressure, the directional flow of the major part of the welding metal from said lugs will be largely inwardly toward the nut bore, thus reducing any external flash of the welding metal at the corners of the nut to a minimum.

As shown in Figure 4 of the drawings, if desired we may provide the opposite end face of the nut body 10 at the threaded bore thereof with thread distorting depressions 28 whereby sections of the adjacent end threads of the nut bore are axially distorted to change the helix angle thereof. Thus a bolt threaded through the bore of the welded nut, as shown in Figure 5, will be securely locked in its adjusted position. Such distortions, we have found, do not lose their gripping action on the thread due to the welding heat applied to the nut in welding it in place, since the depressions 28 are radially inward of the lugs 18 and out of the path of the heating current through the lugs 18.

Referring now to Figure 5 of the drawings, in which we have illustrated one practical application of our improved weldable nut, a corner section for a machine housing, such as that of a washing machine, is represented at 76. The housing walls are internally reinforced by an angular metal ring 78 the flanges of which are securely welded to the housing walls as indicated at 80. One of the housing walls and the contacting flange of the ring 78 are provided with registered openings 82 of predetermined diameter.

The weldable nut 10 is now arranged in position with its threaded bore in coaxial alignment with the openings 82, the end faces 20 of the welding lugs 18 having circumferentially extending surface contact on the face of the flange of ring 78 to position the flat end face 16 of the nut in spaced parallel relation from the face of said flange. The welding electrodes (not shown) are now applied, one of which is stationary and engages the ring flange near its contact with lugs 18 and out of electrical contact with the nut. The top electrode is forced downwardly upon the nut under predetermined hydraulic pressure and the electric current passes through the nut and lugs 18 and the ring flange between said electrodes. The electric current is in sufficient volume and is maintained for the required time (about two seconds) to pass through and heat the welding lugs 18 and the engaged portions of the ring flange to a cherry red color. Thus, under the concurrent application of heat and hydraulic pressure, the metal of the lugs 18 and the contacted portions of the ring flange are fused together and caused to flow inwardly between the nut and ring flange and to fuse with the surface of said flange, and the opposed surface 16 of the nut body. Due to the form of the welding lugs as above described and the location of their contact faces 20 with respect to the corners of the nut the excess fused metal will be largely directed inwardly and circumferentially to form the flash 84 on the wall of the chamfer 14. By the provision of this chamfer, the welding flash will not extend inwardly beyond the thread root diameter of the nut bore and will not foul the thread nor interfere with or obstruct the insertion of the complementary bolt to resist or prevent the threading of said bolt through the bore of the nut. A comparatively small amount of welding flash, indicated at 86 may also occur externally of the nut body. Thus the contacting faces of the nut and the ring flange will be securely welded together over an extensive area at each of the lugs.

In the shipment of a machine provided with our improved welded nut, the machine is placed upon suitable supports within the shipping crate, and the threaded bolts passed through openings in said supports and threaded into the bores of the welded nuts 10. Thus the machine will be tightly held against all possibility of movement relative to the walls of the shipping crate and possible damage to the machine in shipment is obviated. By also providing welded nuts of the self-locking type having distorted thread sections, turning of the fastening bolts in the nuts which might otherwise result from vibration is also effectually prevented.

In the installation of the machine, relatively long supporting foot bolts 88 are provided for the purpose of leveling the machine. The threaded ends 90 of such bolts may be readily inserted upwardly through the openings 82 and adjustably threaded into the bore of the nut 10, the distorted thread sections of the upper end of the nut bore securely locking the bolt legs in adjusted position. The other ends of the bolt legs are preferably provided with heads 92 of enlarged diameter having semi-spherical or convex surfaces 94 for contact with the surface of the floor or other supporting structure. A nut 95 is preferably also threaded on the bolt 88 in contact with the wall of housing 76 to relieve the nut welds of some of the weight of the machine.

From the above description and accompanying drawings, it will be seen that the present invention provides a weldable nut of novel locking construction which may be accurately and rapidly produced by means of a several simple die pressing or stamping operations. Practical tests have demonstrated that by providing the welding lugs in substantially the form above described, a very secure welded connection is obtained. However, in some cases where disrupting forces on the welded connections are not excessive, a weldable nut of the type illustrated in Figure 6 of the drawings may also be found satisfactory. This nut 96 of the hexagonal type is provided with welding lugs 98 projecting from the end face of the nut and which are substantially coextensive in length with alternate side faces of the nut body. These side faces of the nut, and the outer faces of the lugs 98 are disposed in the same plane, while the inner faces of said lugs are radially spaced outwardly from the chamfer 100 at the end of the threaded nut bore. In this case, the chamfer 100 is comparatively shallow, since, when the welding heat and pressure is applied to the nut, the greater part of the welding flash is external along the side faces of the nut, and comparatively little of the welding metal will flow inwardly into the chamfer 100.

Figure 8:
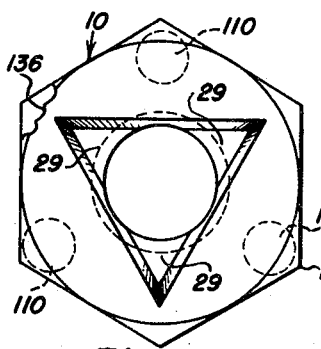
Figure 8 is a similar view of the opposite end of the nut illustrating one desirable location of the distorted thread sections of the nut with respect to the welding projections.
Figure 9:
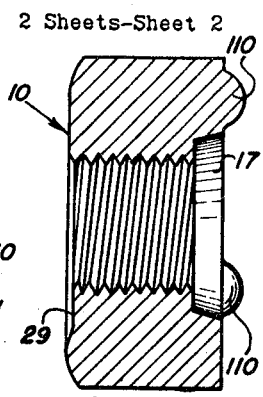
Figure 9 is a sectional view taken on the line 9—9 of Figure 7.
Figure 10:
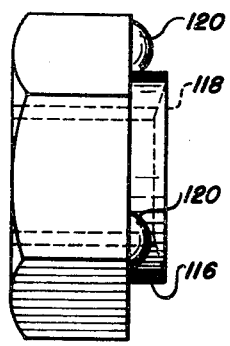
Figure 10 is a side elevation of a piloted type of nut provided with the improved welding projections of Figure 9.
Figure 11:
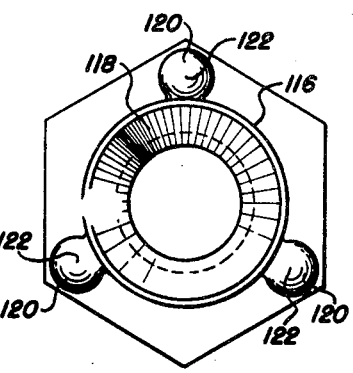
Figure 11 is a bottom plan view thereof.
Figure 12:
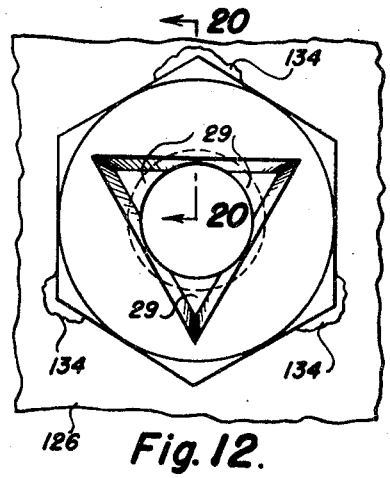
Figure 12 is a top plan view showing the nut of Figure 10 welded to a base plate.
Figure 13:
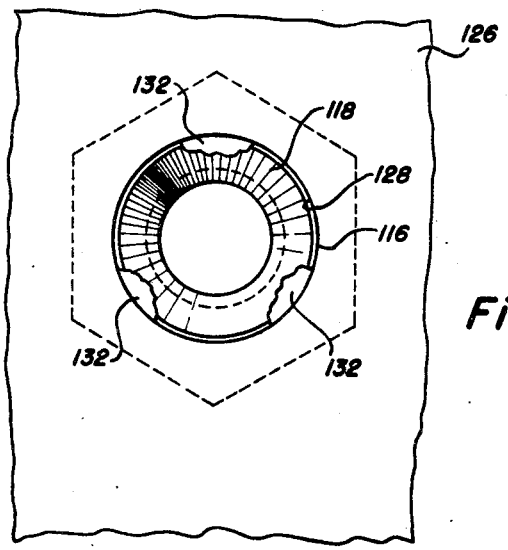
Figure 13 is a bottom plan view of the base plate with the nut welded thereto.

In Figures 7 to 14 inclusive we have illustrated additional embodiments of the invention which are preferred for general application and use. As shown in Figures 7 and 9 the welding projections or lugs 110 on the bottom face of the nut are of semi-spherical form and located inwardly of the alternate corners 11 of the hexagonal nut body. The three projections have equal base diameters 112 which are equi-distantly spaced from the adjacent corners 11 of the nut body and from the annular chamfer or countersink 17 in the bottom face of the nut. Thus the centers 114 of the projections are located on the same radius and it will be noted that the height of the projections is appreciably less than their diameter.

It will be apparent from the above that when the nut is applied by the welding tool each projection 110 will have point contact with the surface of the base plate insuring exact parallelism of the bottom face of the nut with the surface of the base plate and an accurate coaxial alignment of the nut bore with the opening in the base plate.

The semi-spherical projections 110 can be easily formed to exact dimensions in a die press, whereas the formation of such projections with flat or elongated contact surfaces all lying throughout their areas in a common plane is more difficult and may result in a mechanically imperfect contact of the welding projections and the base plate. By the use of the three domed or semi-spherical projections we have successfully solved this difficulty so that rapid, large scale production of uniformly accurate weldable nuts is achieved.

When the welding heat and pressure is applied to the nut the projections 110 fuse with the nut body and the base plate. Under the applied pressure the welding metal will be radially and circumferentially distributed from the center 114 of each projection which results in minimum external welding flash at the corners 11 of the nut body and minimum internal flash within the countersink 17 as in the above described constructions. The countersink is of such depth with respect to the mass of the projection 110 that the nut thread will not be fouled by the welding flash. Thus, while there is a minimum of visible external flash, owing to the size, form and location of the projections a very large proportion of the surface area of the nut body is welded to the base plate.

It will be noted that with the triangular indentations 28 arranged as in Figure 4, the welding lugs are outwardly spaced from the distorted locking sections of the nut thread. However, these indentations may also be disposed as shown at 29 in Figure 8 in radially intersecting relation with the nut corners which are not provided with the welding lugs or in intersecting relation to the flat side faces of the nut between adjacent corners thereof. In the latter instances the distorted thread sections will be spaced circumferentially as well as radially of the welding projections. Thus in each case the distorted thread sections are so remotely located from the welding projections that the locking characteristics of said thread sections will not be deleteriously affected by the welding heat.

Figures 10 to 14 illustrate a piloted type of nut in which an axially projecting piloting flange 116 is formed on the bottom face of the nut in concentric relation to the threaded bore, the end face of said flange being chamfered to provide a comparatively shallow countersink 118. In this case also the semi-spherical projections 120 are spaced inwardly from alternate corners 11 of the nut body. The centers 122 of the projections are located nearer to the flange 116 than to the corners 11 so that the base portions of said projections are integrally formed with the outer surface of the flange as shown at 124.

The depth of the flange 116 relative to the height of the projections 120 is such that the end of the flange enters the opening 128 in base plate 126 sufficiently to accurately pilot the nut to its assembled position on the base plate with the projections 120 in point contact with the face of the plate around the edge of the opening 128. The depth of flanges 116 is preferably slightly less than the thickness of plate 126.

Figure 14:
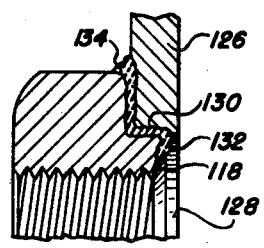
Figure 14 is a detail fragmentary sectional view taken substantially on the line 14—14 of Figure 12.

As the projections 120 are integral with the flange 116 when the welding heat and pressure are applied the major portion of the flash from each projection will flow inwardly between the flange and the edge of opening 128 as shown at 130 in Figure 14, thus, securely welding the flange to the edge of the opening. Final portions of the flash may also flow radially inwardly over the end of flange 116 and upon the chamfered surface 118 of said flange, as seen at 132 in Figure 13. A relatively minor portion of the flash from each projection 120 will protrude externally at the corners of the nut body, as shown at 134 in Figure 12.

Thus, in a single operation the nut body is welded to the face of the plate 126 while the piloting flange 116 is also securely welded to the edge of the opening in said plate to provide additional security against displacement of the nut or its separation from the base plate under the most severe stresses.

Since corrosion of the nut tends to augment the amount of welding flash, we preferably provide a protective plating of copper on the surfaces thereof as indicated at 136 in Figure 8, of the drawings. This plating also has a lubricating action on the nut threads.

It will be seen from the above that in both types of nuts the projections 110 and 120 have sufficient mass to obtain an extensive dispension of the welding metal between the nut body and base plate, without undue external protrusion of welding flash at the nut corners or internal protrusion thereof upon the chamfer in the end face of the nut body or the end of the piloting flange. The chamfered surface, therefore, may also act to accurately center the bolt in the nut for quick and easy starting of the threaded connection.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A weldable lock nut comprising a polygonal metal body having a threaded bore extending from one end face to the other end face, three thread distorting indentations in said one end face forming axially displaced thread sections, and three circumferentially spaced welding lugs projecting from said other end face, said lugs being offset radially outwardly of said displaced thread sections and the centers of said lugs being circumferentially spaced approximately 60° from the centers of adjacent ones of said axially displaced thread sections, thereby assuring an axial flow path for electrical welding current through said nut body along an area delimited by the contact area of said welding lugs with the member to which the nut is to be welded and disposed outwardly of and circumferentially spaced from said thread indentations.

2. A nut adapted to be welded to a metal member having an opening therein comprising a polygonal metal body having a threaded bore extending from one end face to the other end face, three thread distorting indentations in said one end face forming axially displaced thread sections, an annular pilot projecting from said other end face of said body in concentric relation to said bore and adapted to fit within the opening in said member, a chamfer on the outer end face of said pilot, three welding projections on said other end face of said body equi-distantly spaced around said pilot and spaced inwardly from the corners of said body, the centers of said projections being circumferentially spaced approximately 60° from the centers of adjacent ones of said thread distorting indentations, each projection being integrally joined only at its base with the pilot, said projections being offset radially outwardly of said displaced thread sections and contacting said member outwardly of said pilot to assure flow of the major part of the welding flash from said projections inwardly between the pilot and the edge of said opening to weld said pilot to said member, minor portions of the welding flash flowing inwardly over said pilot and being received within said chamfer on said pilot.

References Cited in the file of this patent

UNITED STATES PATENTS

| Number | Name | Date |
|---|---|---|
| 1,027,782 | Watrous | May 28, 1912 |
| 1,249,532 | Smith | Dec. 11, 1917 |
| 1,967,276 | Wilson | July 24, 1934 |
| 1,982,098 | Hartmann | Nov. 27, 1934 |
| 2,013,460 | Erdman | Sept. 3, 1935 |
| 2,016,296 | Rosborough | Oct. 8, 1935 |
| 2,042,953 | McArdle et al. | June 2, 1936 |
| 2,054,187 | Almdale | Sept. 15, 1936 |
| 2,074,678 | Wilcox | Mar. 23, 1937 |
| 2,105,139 | Demboski et al. | Jan. 11, 1938 |
| 2,110,039 | Double | Mar. 1, 1938 |
| 2,167,285 | Smith | July 25, 1939 |
| 2,330,511 | Money | Sept. 28, 1943 |
| 2,335,593 | Howe | Nov. 30, 1943 |
| 2,352,668 | Tripp | July 4, 1944 |
| 2,385,991 | Huntoon | Oct. 2, 1945 |
| 2,595,830 | Demboske | May 6, 1952 |